US007093809B2

(12) United States Patent
Hwang

(10) Patent No.: US 7,093,809 B2
(45) Date of Patent: Aug. 22, 2006

(54) TOOL USED FOR REMOVING AND FITTING A TRANSMISSION GEAR BOX

(76) Inventor: Cherng-Bin Hwang, No. 76-1, Liouzihlin, Lioulin Village, Shueishang Township, Chiayi County 608 (TW)

( * ) Notice: Subject to any disclaimer, the term of this patent is extended or adjusted under 35 U.S.C. 154(b) by 0 days.

(21) Appl. No.: 10/914,179

(22) Filed: Aug. 10, 2004

(65) Prior Publication Data

US 2006/0032993 A1 Feb. 16, 2006

(51) Int. Cl.
*F16M 11/38* (2006.01)

(52) U.S. Cl. ...................................... 248/166; 248/127

(58) Field of Classification Search ................ 248/127, 248/158, 163.1, 167, 176.1, 176.3, 188.6, 248/166; 269/16, 17, 46, 48.2
See application file for complete search history.

(56) References Cited

U.S. PATENT DOCUMENTS 1,495,894 A * 5/1924 Du Bois ...................... 269/76
4,010,942 A * 3/1977 Ward ........................... 269/15
4,479,632 A * 10/1984 McIntire et al. ............ 254/3 B
4,705,264 A * 11/1987 Hawkins et al. .............. 269/17
4,905,946 A * 3/1990 Wang ......................... 248/170
5,141,211 A * 8/1992 Adams, Jr. ................... 269/16
5,164,011 A * 11/1992 Ray ........................... 118/500
5,340,068 A * 8/1994 Sarkisian et al. ........ 248/188.6
5,897,100 A * 4/1999 Napier et al. ............... 254/8 B
6,581,920 B1 * 6/2003 Smith et al. .................. 269/17
6,685,156 B1 * 2/2004 Dicke et al. ................ 248/624
6,755,381 B1 * 6/2004 Levin et al. ............. 248/163.1
6,793,191 B1 * 9/2004 Williams et al. ............ 248/624

* cited by examiner

*Primary Examiner*—A. Joseph Wujciak, III
(74) *Attorney, Agent, or Firm*—Rosenberg, Klein & Lee

(57) ABSTRACT

A tool includes a holding device for holding a transmission gear box in position with, and a support member supporting the holding device thereon; the holding device has a fitting shank projecting out from a first end portion thereof; the support member includes an upright support rod, a horizontal support rod secured to a lower end of the upright rod, and a pair of supporting legs pivoted to the horizontal rod; the upright rod has a central shaft fitted to an upper end thereof; a connecting sleeve is fitted around, and secured to the central shaft of the upright support rod at a first end thereof, and fitted around, and secured to the fitting shank of the holding device at a second end thereof so as to secure the holding device to the central shaft.

2 Claims, 10 Drawing Sheets

TOOL USED FOR REMOVING AND FITTING A TRANSMISSION GEAR BOX

BACKGROUND OF THE INVENTION

1. Field of the invention

The present invention relates to a tool used for removing and fitting a transmission gear box, more particularly one, which is made in such a way as to have reduced size and material cost, and a simpler structure.

2. Brief Description of the Prior Art

Referring to FIG. 1, a conventional tool for removing and fitting a transmission gear box with includes a holding device 2 for holding a transmission gear box (B) in position with, a connecting member 21 connected with the holding device 2, and a support member supporting the holding device 2 thereon, which includes an upright support rod 1, a horizontal support rod 11 secured to a lower end of the upright support rod 1, a pair of supporting legs 14 respectively pivoted to pivotal portions 13 of the horizontal support rod 11, and a locating board 15 secured on an upper end of the upright support rod 1; the horizontal support rod 11 has casters 12 fitted thereto, and the supporting legs 14 also have casters fitted thereto. The locating board 15 has a curved locking slot 152 thereon. The connecting member 21 includes an L-shaped part 211 fitted on the locating board 15 in an angularly displaceable manner, a board part 212 securely connected to the L-shaped part 211, and a connecting shaft 213 securely joined to both the holding device 2 and the board part 212. And, a bolt 151 is passed through the L-shaped part 211 and the curved locking slot 152 of the locating board 15, and connected with a nut to prevent the L-shaped part 211 from moving relative to the locating board 15.

Thus, the holding device 2 can be used to hold a transmission gear box after the bolt 151 is tightened, and it can be angularly adjusted relative to the locating board 15 after the bolt 151 is undone. However, because the connecting member 21 is relatively large and heavy, it takes much material to manufacture the connecting member 21, and the above tool isn't convenient or economical to use.

SUMMARY

It is a main object of the present invention to provide an improvement on a tool used for removing and fitting a transmission gear box to overcome the above disadvantages.

The tool of the present invention includes a holding device for holding a transmission gear box in position with, and a support member supporting the holding device thereon. The holding device has a fitting shank projecting out from a first end portion. The support member includes an upright support rod, and a horizontal support rod secured to a lower end of the upright support rod. The upright support rod has a central shaft fitted to an upper end thereof while a connecting sleeve is fitted around, and secured to the central shaft at a first end thereof, and fitted around, and secured to the fitting shank at a second end thereof; thus, the holding device is held steady on the upright support rod.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
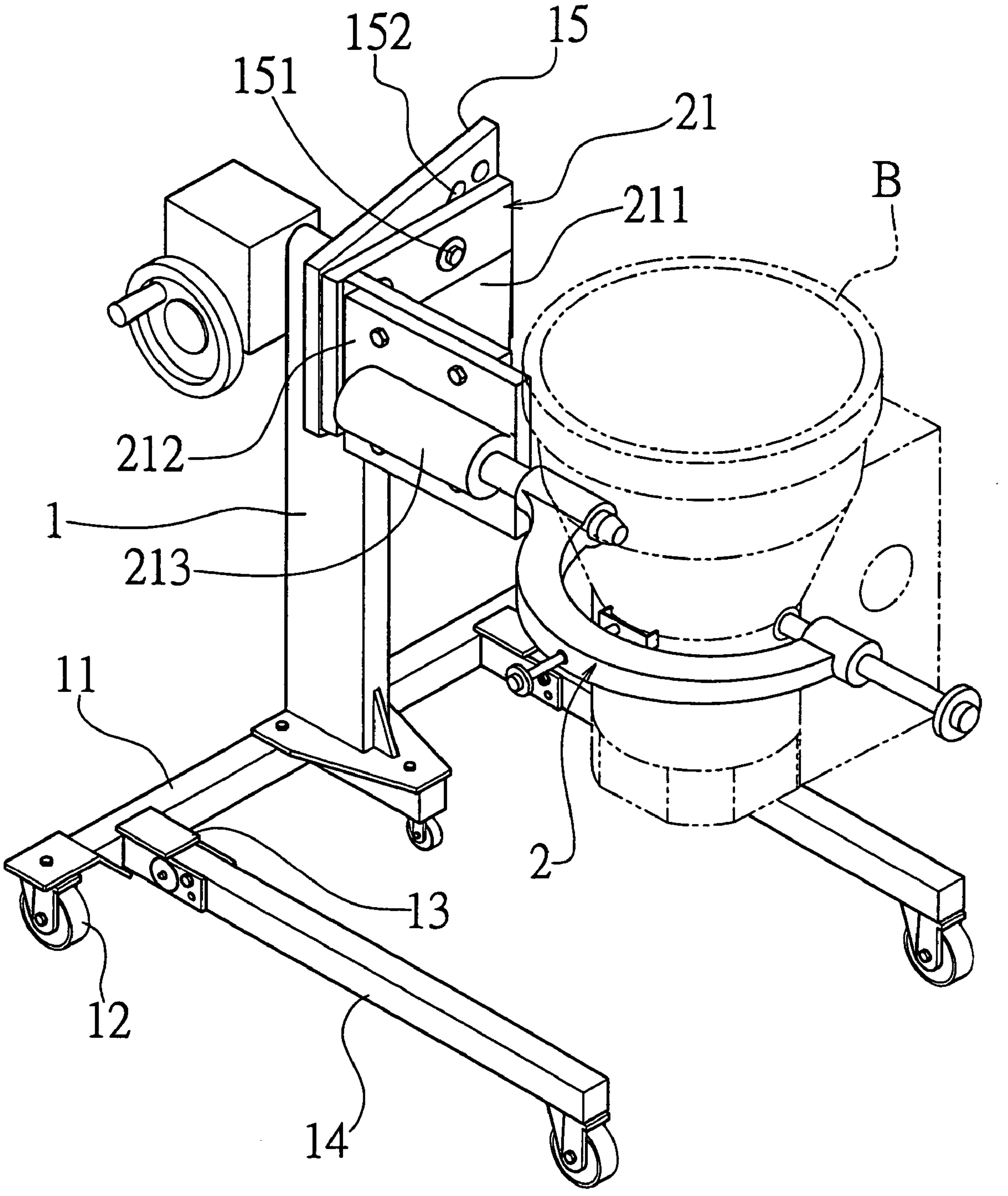
F I G. 1 (PRIOR ART)
FIG. 1 is a perspective view of the conventional tool used for removing and fitting a transmission gear box.
Figure 2:
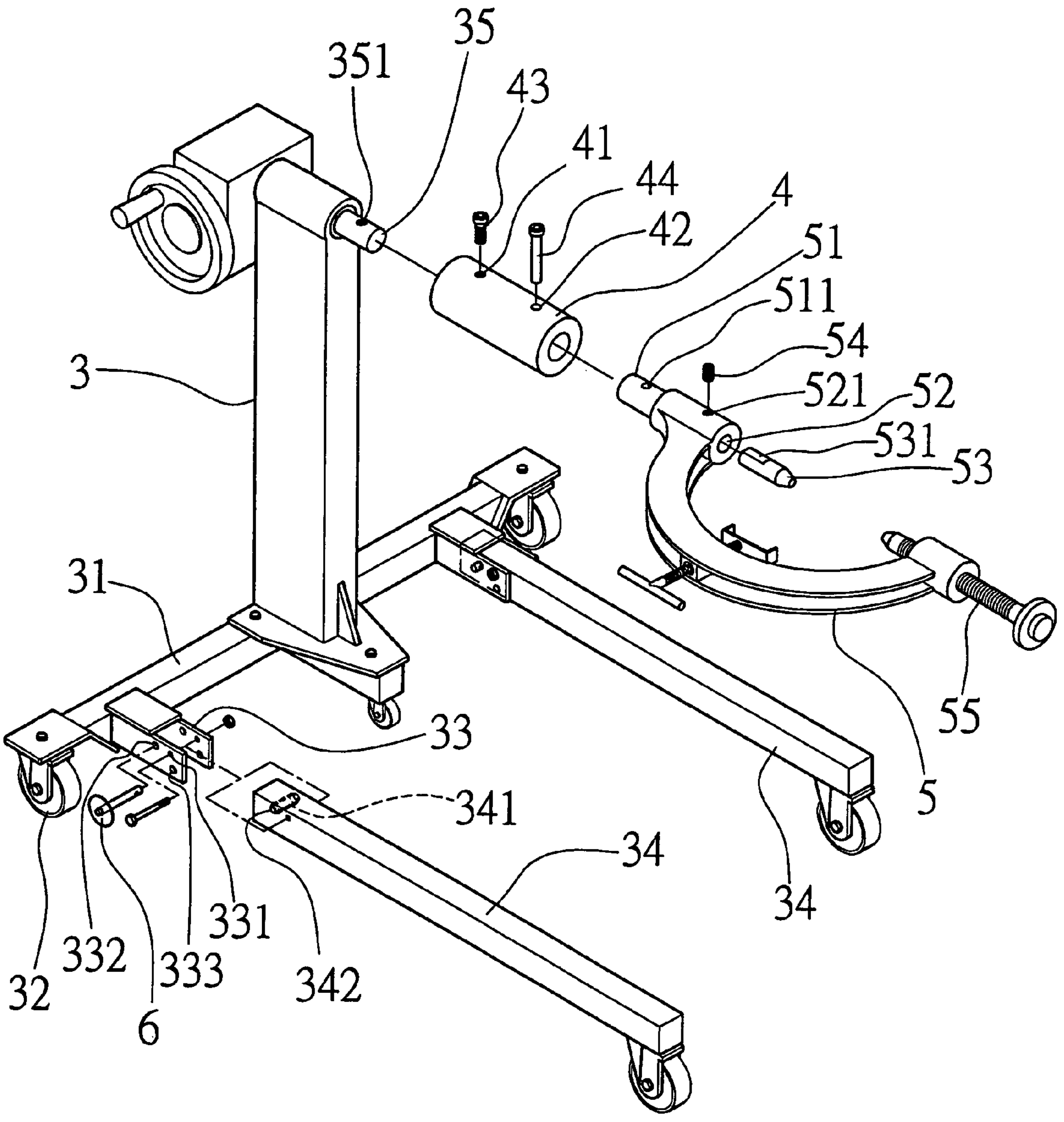
FIG. 2 is an exploded perspective view of the tool used for removing and fitting a transmission gear box in the present invention.

Referring to FIG. 1, a preferred embodiment of a tool used for removing and fitting a transmission gear box includes a holding device 5, a support member used to hold the holding device 5 in position, and a connecting sleeve 4 for connecting the holding device 5 to the support member.

The support member consists of an upright support rod 3, a horizontal support rod 31, and a pair of supporting legs 34. The upright support rod 3 has a central shaft 35 fitted to an upper end thereof, which is formed with a radial screw hole 351.

The connecting sleeve 4 has an axial screw hole 41, and an axial pin hole 42, and it is fitted around the central shaft 35 at one end thereof, and secured in position with a threaded securing element 43 being screwed into both the axial screw holes 41 and 351.

The holding device 5 is provided for holding a transmission gear box in position with, and includes a fitting shank 51 projecting out from a first end portion, an axial holding hole 52 on the first end portion, and an adjusting screw 55 at a second end portion thereof. The fitting shank 51 has a radial pin hole 511 while the first end portion of the holding device 5 has a radial screw hole 521 communicating with the axial holding hole 52. A center 53, which has flat side 531, is held in the axial holding hole 52 to be aligned with the adjusting screw 55 while a securing element 54 is screwed into the radial screw hole 521, and pressed against the flat side 531 of the center 53 to secure the center 53.

The holding device 5 is passed into the other end of the connecting sleeve 4 at the connecting shank 51 thereof, and a pin 44 is inserted in both the radial pin holes 42 and 511 to secure the holding device 5 to the connecting sleeve 4; thus, the holding device 5 is held steady on the central shaft 35 at the upper end of the upright support rod 3.

The horizontal support rod 31 is securely connected to a lower end of the upright support rod 3 at a middle portion, and casters 32 are fitted to two ends of the horizontal support rod 31. And, the horizontal support rod 31 has two pivotal portions 33 secured thereon, each near to a respective caster 32. Each of the pivotal portions 33 has two opposing pivotal holes 331, a first pair of opposing through holes 332, and a second pair of opposing through holes 333.

Figure 4:
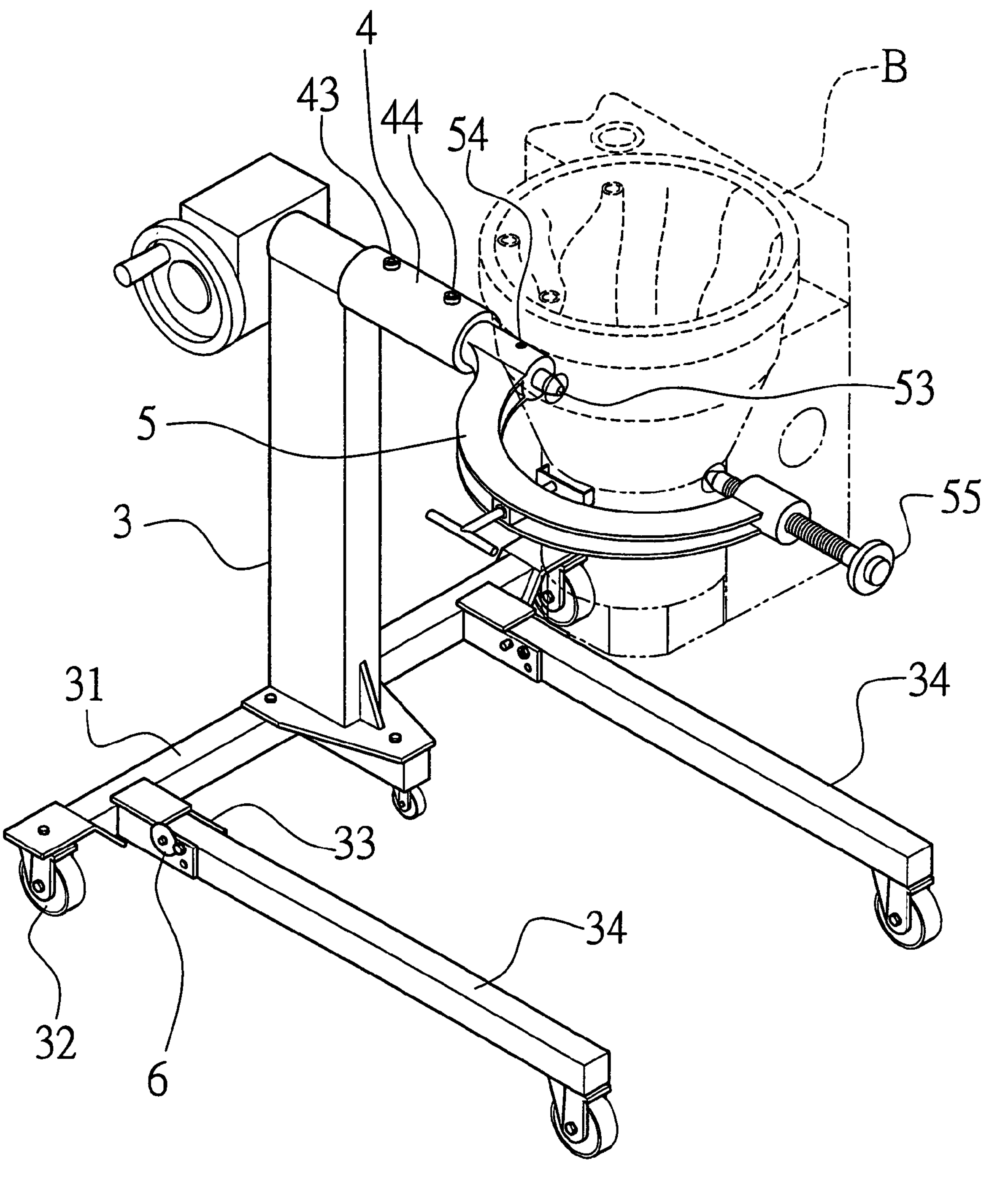
FIG. 4 is a perspective view of the present tool with a transmission gear box securely held thereon.
Figure 9:
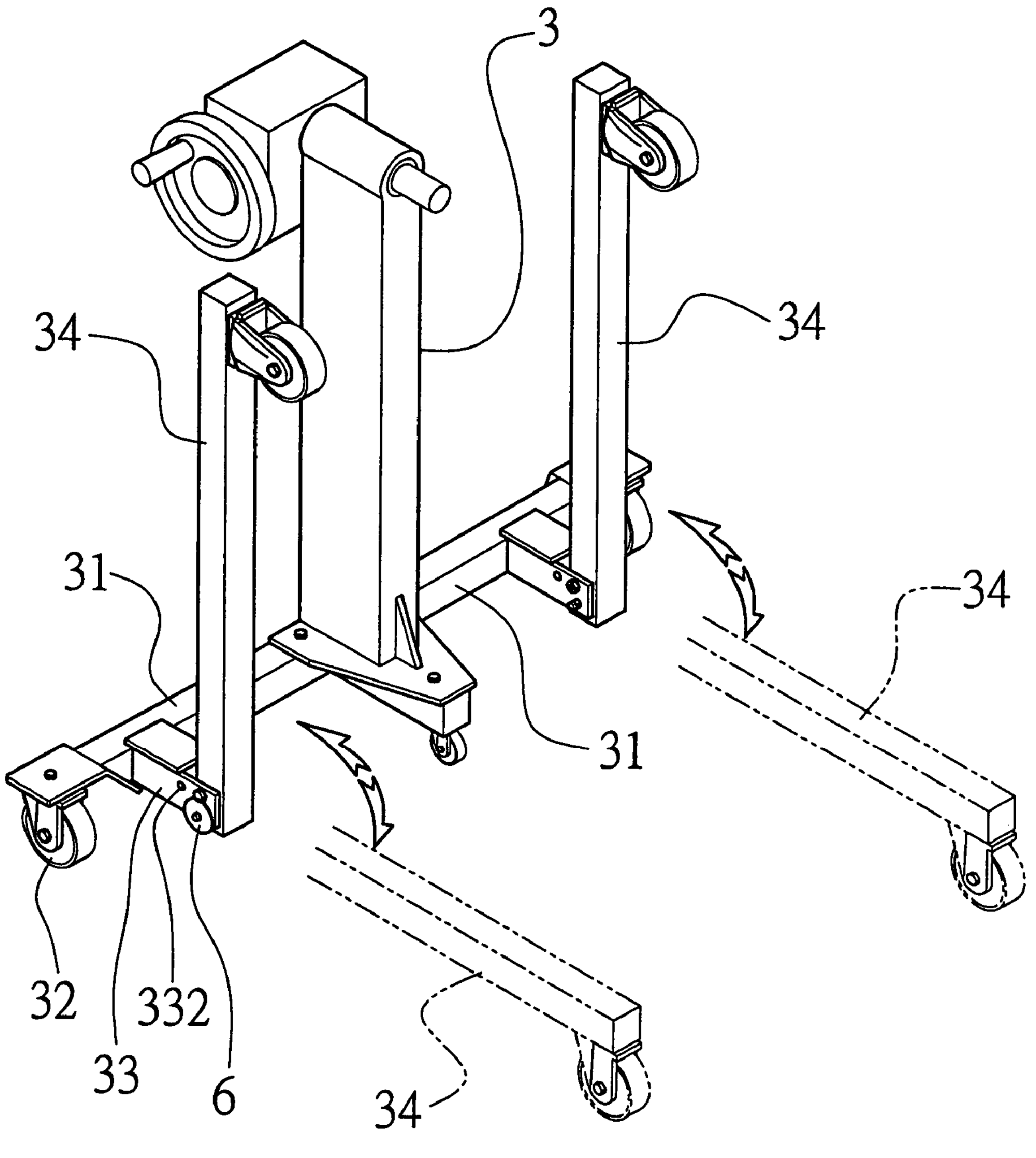
FIG. 9 is a perspective view of the present tool with the supporting legs pivoted to an upright position.

Each of the supporting legs 34 has a caster fitted to a first end, and a sleeve 341 fitted in a second end thereof, which sleeve 341 has an axial through hole 342 communicating with outside. Each of the supporting legs 34 is pivoted to a respective pair of pivotal holes 331 of the pivotal portions 33 of the horizontal support rod 31, and can be secured in position by means of a respective lock bar assembly 6 after it has been pivoted to a horizontal position as shown in FIG. 4, and after it has been pivoted to an upright position as shown in FIG. 9.

Figure 3:
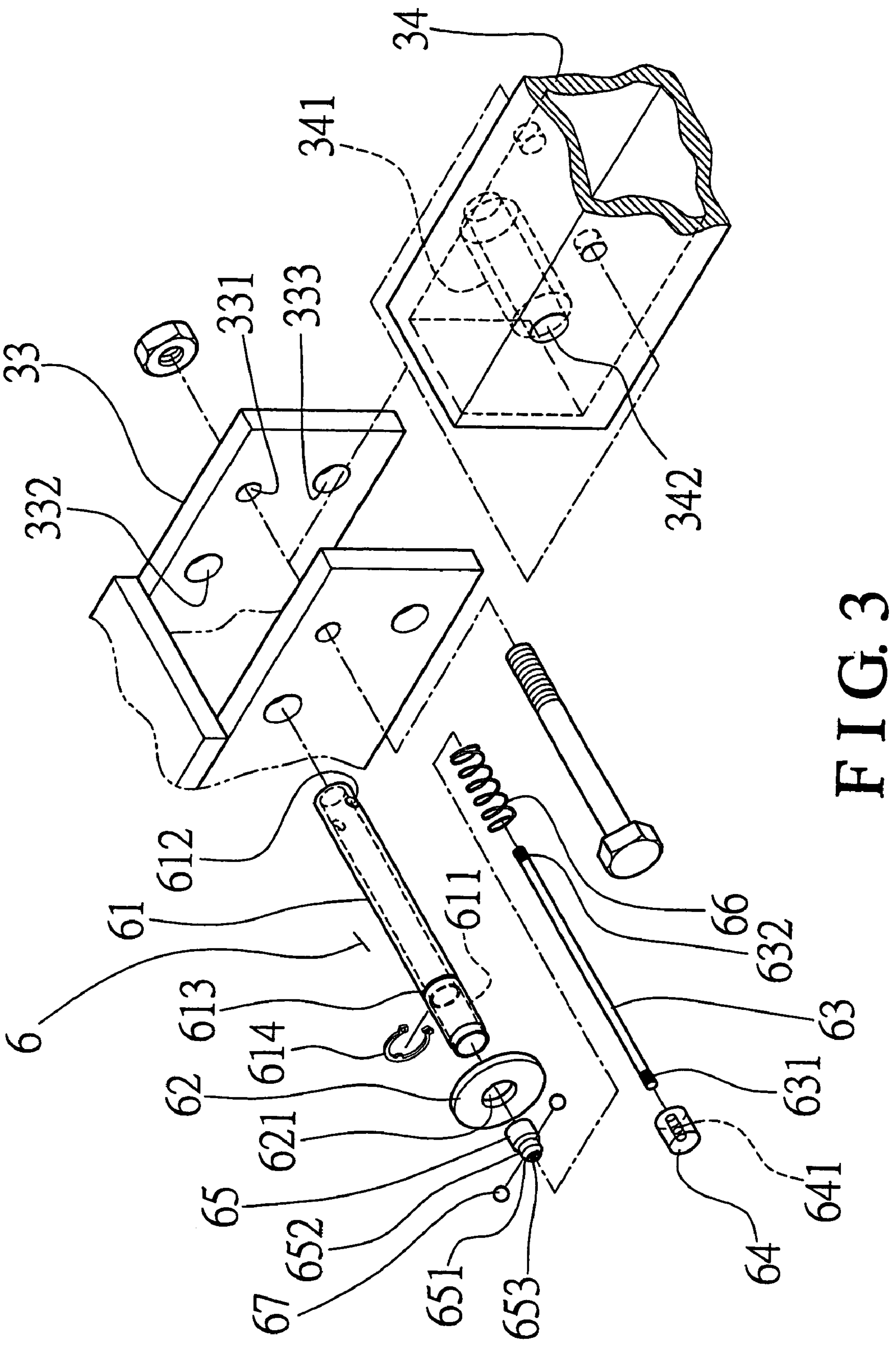
FIG. 3 is a partial exploded perspective view of the tool in the present invention.

Referring to FIG. 3, each lock bar assembly 6 includes:

an outer tube 61 having a holding room 611 in a first end portion, an axial hole, two opposing radial holes 612 near to a second end, an annular trench 613 on an outer side, and a C-shaped ring 614 securely fitted on the annular trench 613; the holding room 611 communicating with, and having a larger diameter than the axial hole; the radial holes 612 communicating with the axial hole;

a disk 62 having a through hole 621 and secured around the first end of the outer tube 61;

an elongated rod 63 having screw threads 631 and 632 on first and second ends thereof;

a button 64 having a screw hole 641; the button 64 having a smaller diameter than the holding room 611 of the outer tube 61;

a pushing element 65 having an advance angle 651 around a first end, an annular step-shaped portion 652 on an outer side, and a screw hole 653; the pushing element 65 having a smaller diameter than the axial hole of the outer tube 61;

an elastic element 66 held in the holding room 611 of the outer tube 61; and two beads 67 movably held in respective radial holes 612 of the outer tube 61;

the elongate rod 63 being passed into the outer tube 61, and screwed into the button 64 and the pushing element 65 respectively at the first and the second ends thereof such that the button 64 contacts an outward end of the elastic element 66, and such that the pushing element 65 normally contacts the beads 67 at the annular step-shaped portion 652 thereof to force the same to project out from the radial holes 612 of the outer tube 61.

Figure 8:
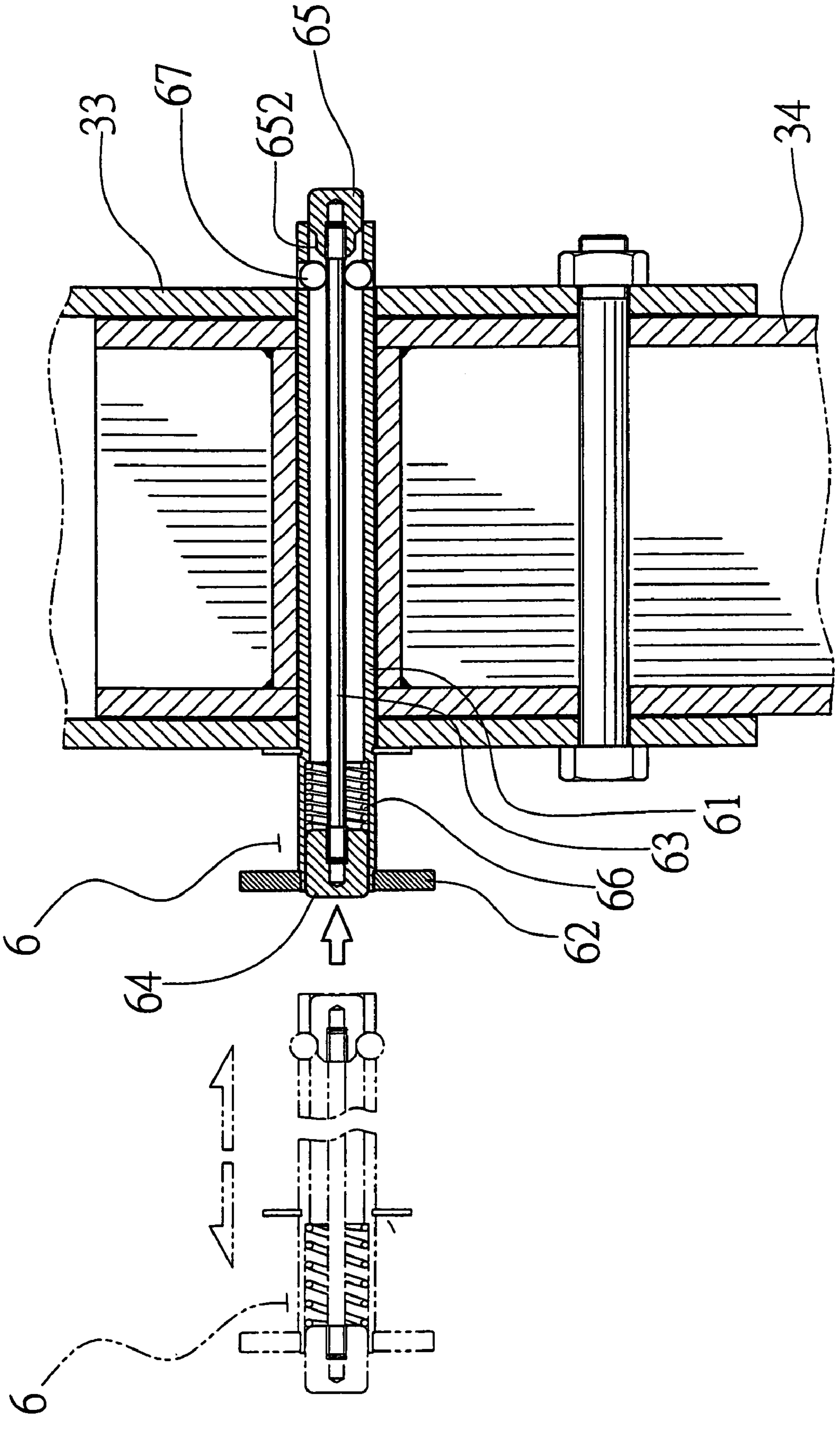
FIG. 8 is a cross-sectional view of the lock bar assembly changed into a position where it is separable from the associated parts.

Therefore, referring to FIG. 8, as soon as the buttons 64 of the lock bar assemblies 6 are pressed into the holding rooms 611, the pushing elements 65 will move away from the beads 67, allowing the beads 67 to move into the outer tube 61; thus, the lock bar assemblies 6 are in an unlocking position, and can be passed through the sleeves 341 of the supporting legs 34 as well as the through holes 332, 333 of the pivotal portions 33. As soon as the user stops pressing the buttons 64, the elastic elements 66 will force the buttons 64 to move out of the holding rooms 611, and the pushing elements 65 will contact the beads 67 at the annular step-shaped portion 652 thereof, and make the beads 67 project out from the outer tubes 61 again.

Figure 6:
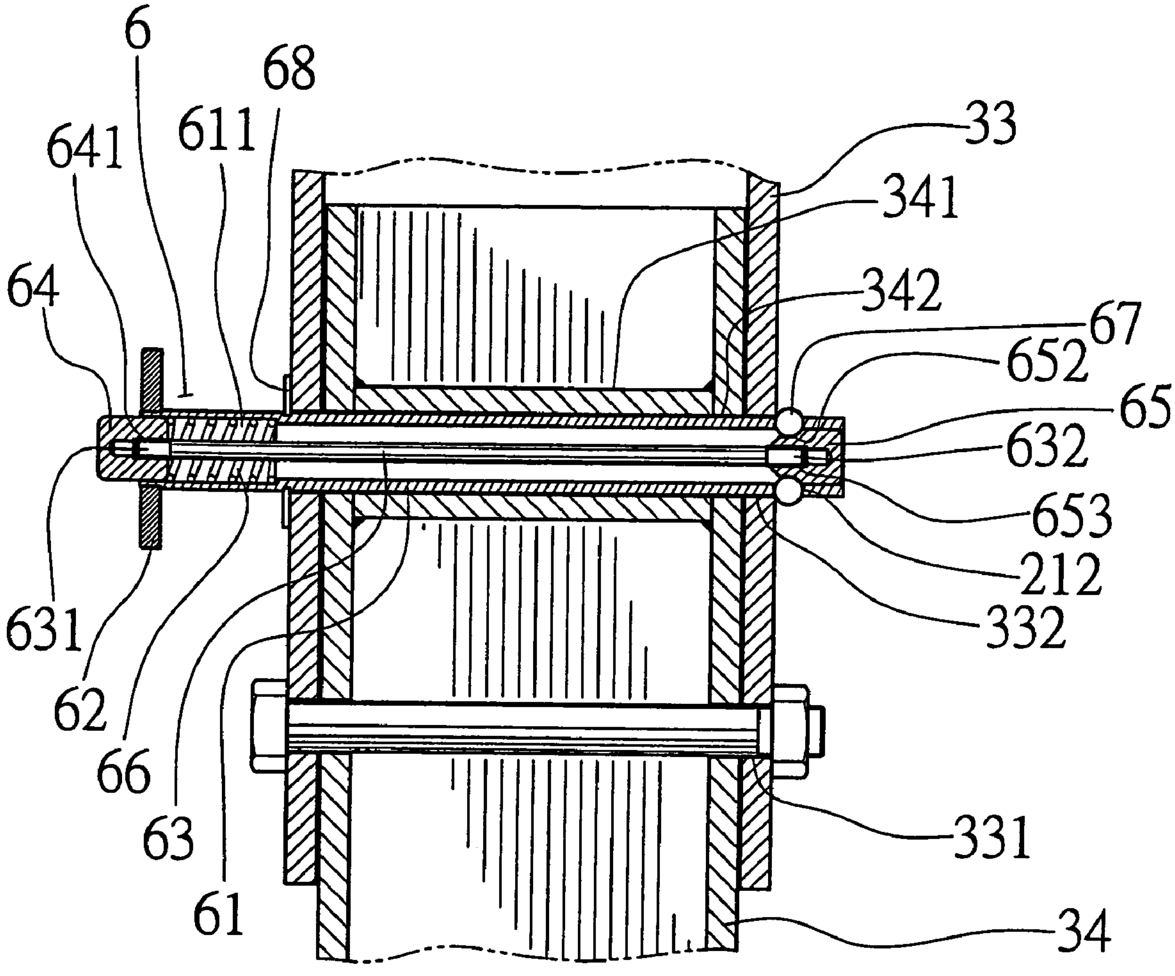
FIG. 6 is a cross-sectional view of the lock bar assembly.

And, referring to FIG. 6, each lock bar assembly 6 will be stopped from moving relative to the corresponding pivotal portion 33 with the beads 67 projecting outwards to contact an outer side of the pivotal portion 33 as soon as the user stops pressing the button 64 after he has passed the lock bar assembly 6 through the pair of through holes 332 (or 333); while the outer tube 61 is being passed through the pivotal portion 33, the C-shaped ring 614 will come into contact with the pivotal portion 33, helping the lock bar assembly 6 located at a proper position; the disks 62 are provided for the user to hold with his fingers when he is using the lock bar assemblies 6.

Therefore, the supporting legs 34 will be secured in a horizontal position by means of inserting the lock bar assemblies 6 through the through holes 332 as well as the sleeves 341 after supporting legs 34 have been pivoted to the laid down position, as shown in FIG. 4, allowing the casters of the supporting legs 34 to touch the ground like the casters of the horizontal support rod 31. And, the supporting legs 34 will be secured in a folded position by means of inserting the lock bar assemblies 6 through the through holes 333 as well as the sleeves 341 after they have been pivoted to the upright position, as shown in FIG. 9.

Figure 5:
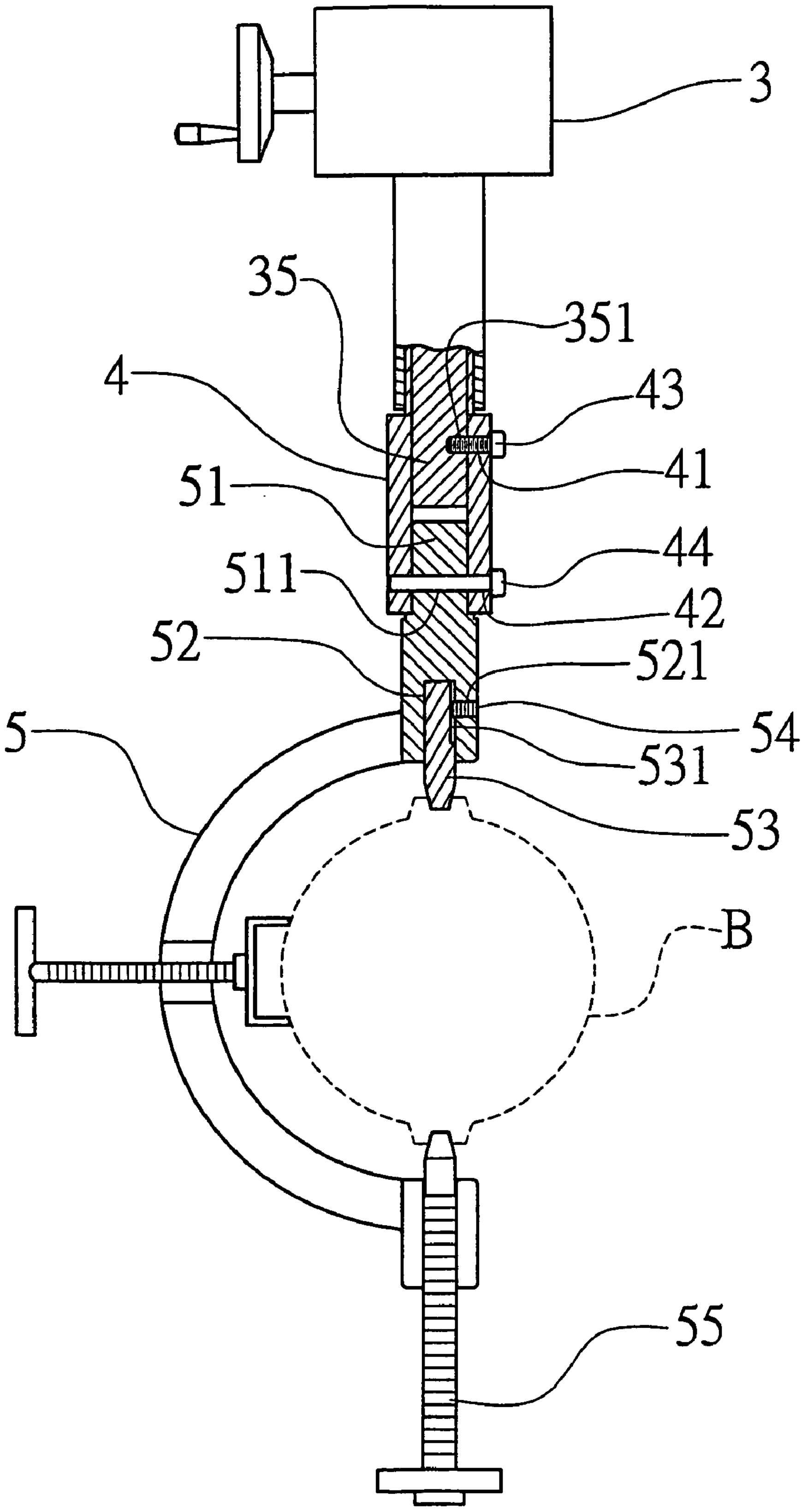
FIG. 5 is a horizontal section of the tool of the present invention with a transmission gear box secured thereon.
Figure 7:
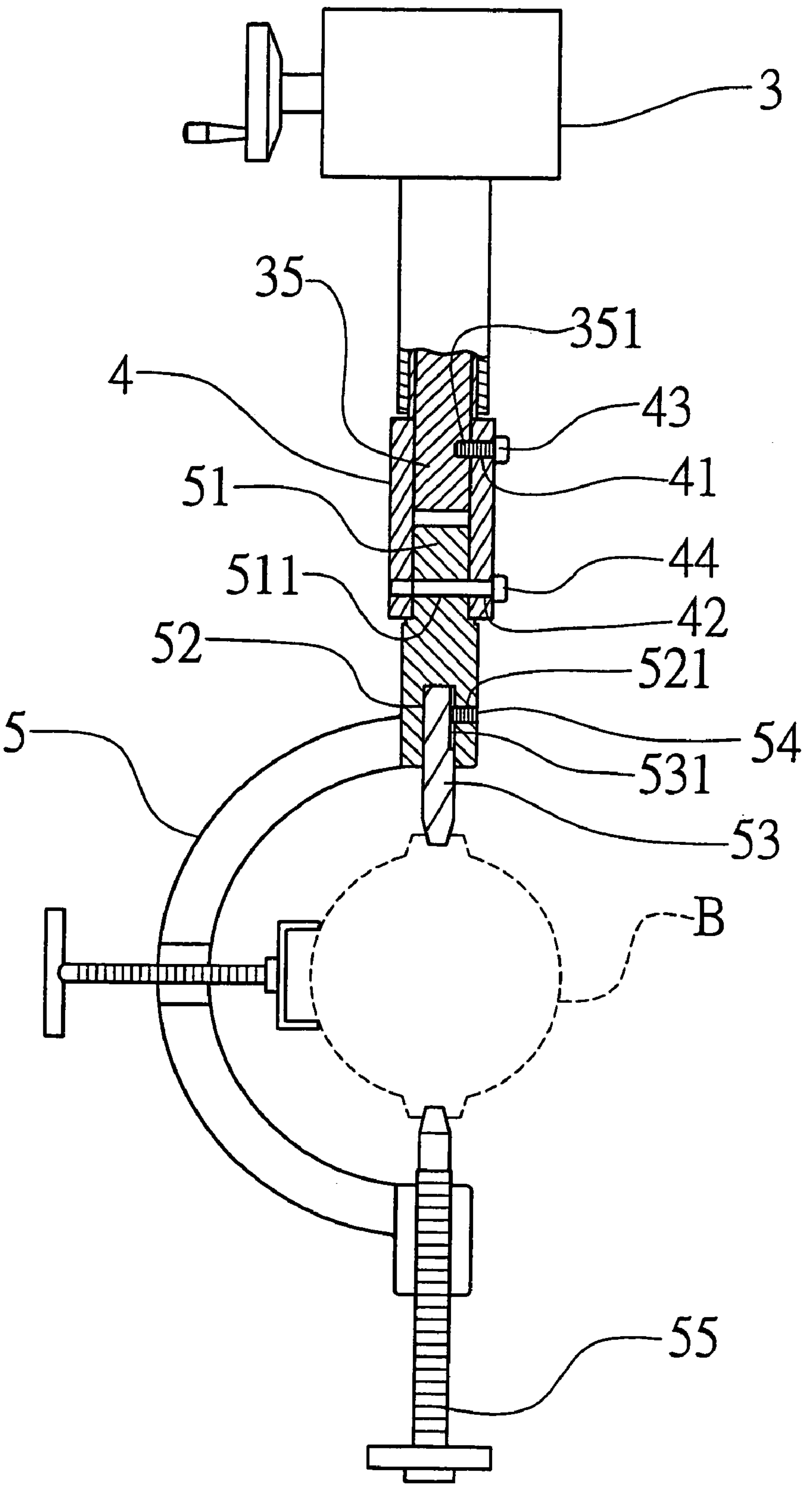
FIG. 7 is a horizontal section of the present tool with another transmission gear box secured thereon.

Referring to FIG. 4, to remove a transmission gear box (B) or to fit one in position, the transmission gear box (B) is disposed between the center 53 and the adjusting screw 55 of the holding device 5, and the adjusting screw 55 is turned until the transmission gear box (B) is secured in position. Referring to FIGS. 5 and 7, because the center 53 can be removed after the securing element 54 is undone, the user can choose one with a suitable length to use from centers with different lengths according to the size of a transmission gear box to be secured with the holding device 5.

Figure 10:
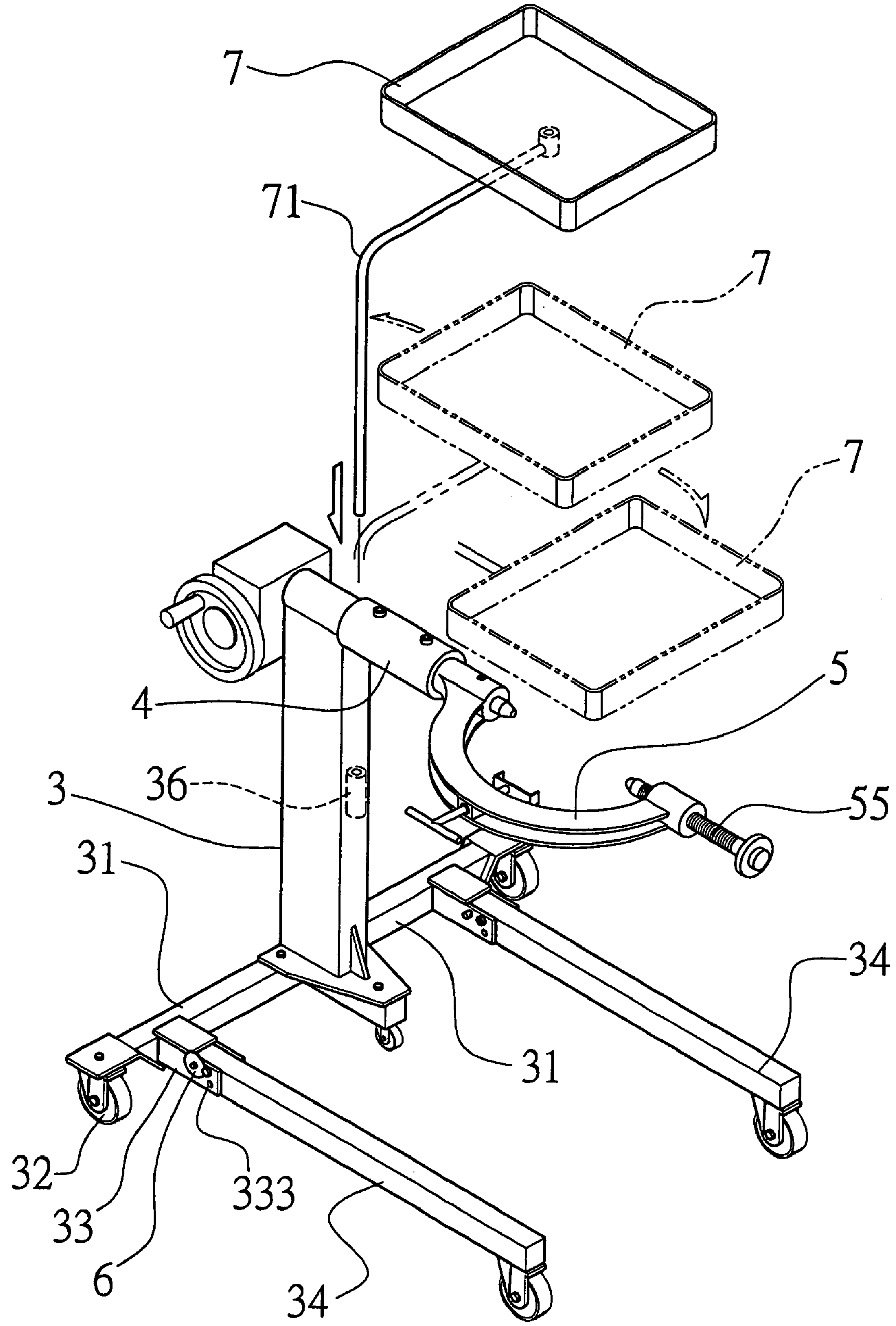
FIG. 10 is a perspective view of the second embodiment of a tool used for removing and fitting a transmission gear box.

Referring to FIG. 10, the present tool is further equipped with a tray 7 whose bottom side has an insertion rod 71 secured thereto such that the tray 7 can be held in position by means of inserting the insertion rod 71 into a supporting tube 36, which is secured on the upright support rod 3. In addition, the tray 7 can change direction with the insertion rod 71 turning on the supporting tube 36.

From the above description, it can be seen that the tool of the present invention has advantages as followings:

1. Because the holding device 5 is held on the upright support rod with the help of both the central shaft and the connecting sleeve, size and material cost of the present tool are reduced, and the structure is simplified.
2. With the help of the lock bar assemblies, the supporting legs can be effectively secured in position without possibility of accidental displacement after they have been pivoted to the upright position and after they have been pivoted to the horizontal position. And, the lock bar assemblies are easy to use.
3. The tool is equipped with the tray for holding other objects and tools on, and the tray can be angularly displaced to any suitable orientation according to the user's need.

The invention claimed is:

1. A tool for removing and fitting a transmission gear box with, comprising a holding device for holding a transmission gear box in position with; the holding device having a fitting shank projecting out from a first end portion thereof;

a support member supporting the holding device thereon; the support member including an upright support rod, a horizontal support rod secured to a lower end of the upright support rod, and a pair of supporting legs pivoted to the horizontal support rod; the upright support rod having a central shaft fitted to an upper end thereof, the horizontal support rod having two pivotal portions, each pivotal portion having plural pairs of opposing through holes, each of the supporting legs having a caster fitted to a first end and a through hole at a second end, and being pivoted to a respective pivotal portion of the horizontal support rod, the horizontal support rod being equipped with two lock bar assemblies for securing the supporting legs in position on the pivotal portions;

each lock bar assembly including:

(a) an outer tube having a holding room in a first end portion and an axial hole along another end portion, the outer tube having two opposing radial holes adjacent a second end and communicating with the axial hole, the holding room communicating with and having a larger diameter than the axial hole;

(b) a disk secured around the first end of the outer tube;

(c) an elongated rod having screw threads on first and second ends thereof;

(d) a button having a screw hole and a smaller diameter than the holding room of the outer tube, the button being screwed onto the first end of the elongate rod;

(e) a pushing element having an advance angle around a first end, an annular step-shaped portion on an outer side, and a screw hole, the pushing element having a smaller diameter than the axial hole of the outer tube, the pushing element being screwed onto the second end of the elongate rod;

(f) an elastic element held in the holding room of the outer tube; and (g) two beads movably held in respective radial holes of the outer tube, the elongate rod being passed into the outer tube such that the button contacts an outward end of the elastic element, and such that the pushing element normally contacts the beads at the annular step-shaped portion thereof to force the beads to project out from the radial holes of the outer tube, as soon as the button is pressed into the holding room, the pushing element being going to move away from the beads, allowing the beads to move into the outer tube and allowing the lock bar assembly to pass through the through holes of a corresponding pivotal portion of the horizontal support rod, the beads being capable of preventing the lock bar assembly from passing through the through holes of a corresponding pivotal portion when they are made to project out from the outer tube, whereby the supporting legs can be secured to the corresponding pivotal portions with the lock bar assemblies being passed through the through holes of the pivotal portions and the through holes thereof; and a connecting sleeve connecting the holding device to the support member;

the connecting sleeve being fitted around, and secured to the central shaft of the upright support rod at a first end thereof, and fitted around, and secured to the fitting shank of the holding device at a second end thereof, thus securing the holding device to the central shaft, wherein the holding device has an axial holding hole, and a radial screw hole communicating with the axial holding hole on the first end portion thereof, and a center, which has a flat side, being held in the axial holding hole;

said center being secured in position by a securing element screwed into the radial screw hole, and pressed against the flat side.

2. The tool as claimed in claim 1, wherein the central shaft has a radial screw hole, the fining shank has a radial pin hole, and the connecting sleeve has a radial screw hole and a radial pin hole respectively on the first and the second ends thereof, a securing element being screwed into both the radial screw holes; a pin being inserted into both the pin holes.

* * * * *